US012567036B2

(12) United States Patent (10) Patent No.: US 12,567,036 B2
Jha et al. (45) Date of Patent: Mar. 3, 2026

(54) DECISION PIPELINE FOR FORECASTING AND OPTIMIZATION IN RESOURCE PLANNING

(71) Applicant: Dell Products L.P., Round Rock, TX (US)

(72) Inventors: Saurabh Jha, Austin, TX (US); Sailendu Kumar Patra, Bangalore (IN); Priya Shanmugasundaram, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 18/633,849

(22) Filed: Apr. 12, 2024

(65) Prior Publication Data

US 2025/0322349 A1 Oct. 16, 2025

(51) Int. Cl.
*G06Q 10/087* (2023.01)
(52) U.S. Cl.
CPC ................................. *G06Q 10/087* (2013.01)
(58) Field of Classification Search
CPC ...................................................... G06Q 10/087

USPC .......................................................... 705/28
See application file for complete search history.

(56) References Cited

U.S. PATENT DOCUMENTS

| | | | | |
|---|---|---|---|---|
| 7,603,462 | B2 * | 10/2009 | Tang | G06Q 10/087 |
| | | | | 705/28 |
| 2022/0075383 | A1 * | 3/2022 | Morad | G06N 3/08 |
| 2025/0150092 | A1 * | 5/2025 | Cooper | H03M 7/42 |

* cited by examiner

*Primary Examiner* — Russell S Glass
(74) *Attorney, Agent, or Firm* — Chamberlain, Hrdlicka, White, Williams & Aughtry; Aly Z. Dossa

(57) ABSTRACT

A method for managing order processing includes obtaining a set of time series datasets associated with the order processing for an order processing system, generating forecasting parameters of the time series datasets using gradient recurrent units (GRU) and a latent space embedding, performing a cosine similarity of the forecasting parameters to obtain probability distributions of forecasting models, performing a stochastic optimization on the forecasting parameters using a two-stage cost-reward analysis to obtain intermediate parameters, obtaining finalized forecasting parameters based on the intermediate parameters, and initiating an agent deployment on the order processing system based on the finalized forecasting parameters.

20 Claims, 5 Drawing Sheets

Computer
500

DECISION PIPELINE FOR FORECASTING AND OPTIMIZATION IN RESOURCE PLANNING

BACKGROUND

Order processing and query incident management are branches of a corporate entity that manage the purchases between customers and the corporate entity. The corporate entity may manage the deployment of agents for the purposes of providing order processing services. The deployment of agents may involve the consumption of resources, so it may be beneficial to accurately deploy a proper number of agents based on an expected volume of orders to be processed.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
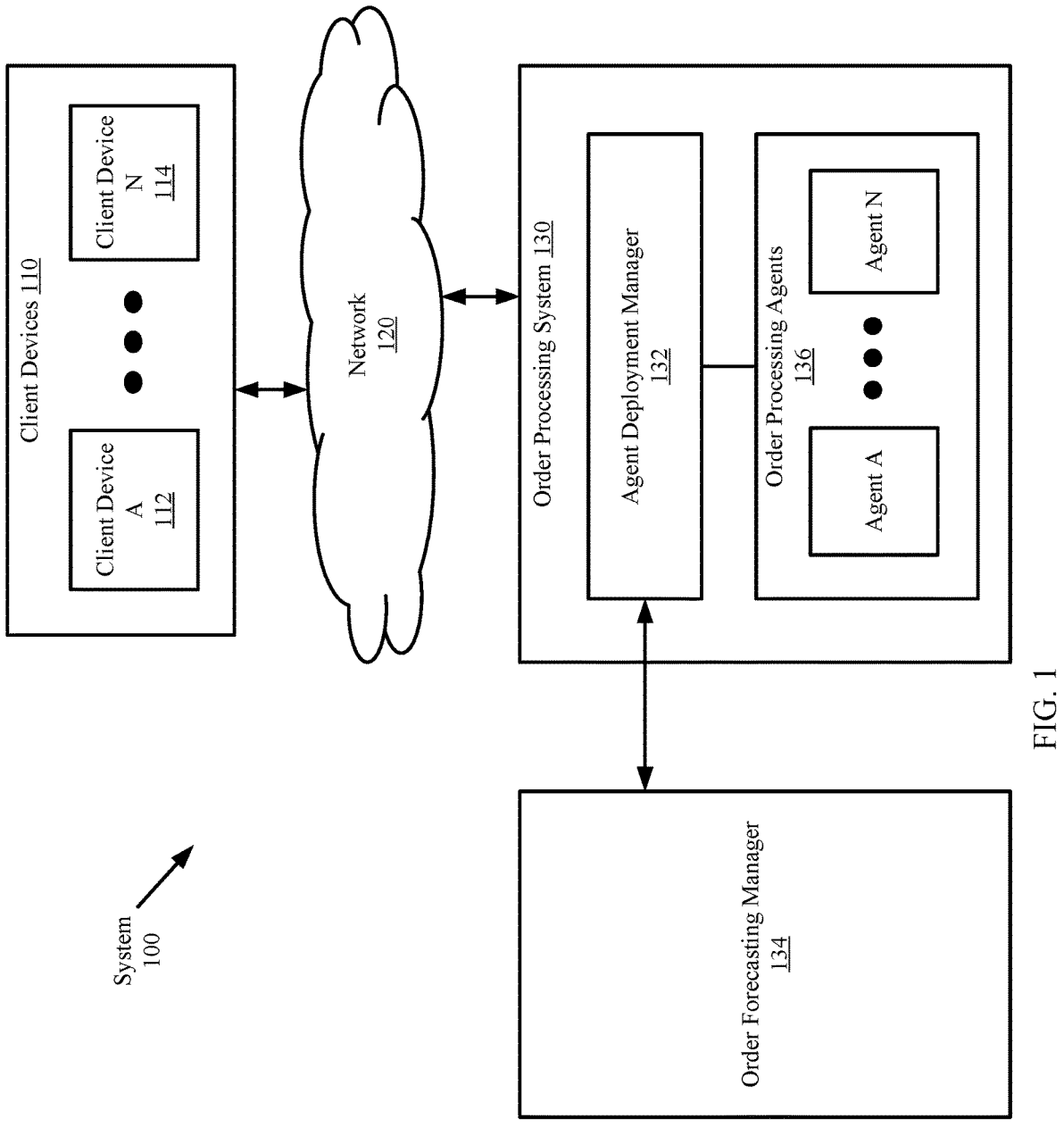
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein include methods and systems for managing order processing of a corporate entity. Embodiments disclosed herein include tracking the number of orders processed over a period of time for multiple epicenters (e.g., branches of the corporate entity), storing each of the tracked number of orders as a time series dataset. A processing of the set of time series datasets in accordance with one or more embodiments of the invention includes applying the data in a decision pipeline that includes a forecasting module, a stochastic optimization module, and a decision error module. The result of applying the decision pipeline to the time series historical datasets include one or more forecasting models. The forecasting models may be used for managing the resource distribution applied for order processing. For example, if the forecasting models specify increase in order volumes, the resource distribution may include increasing a number of agents deployed for the purposes of order processing. Further, if the forecasting models specify a relative decrease in order volumes, the resource distribution may include increasing a number of agents deployed for the purposes of order processing The following describes various embodiments of the invention.

FIG. 1 shows a system in accordance with one or more embodiments of the invention. The system (100) includes any number of client devices (110), a network (120), an order processing system (130), and an order forecasting manager (134). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments of the invention, the order processing system (130) may provide computer-implemented services to users. The computer-implemented services may include deploying order processing agents (136) (also referred to as processing agents (136)) that aid in communicating with the client devices (110) to process orders for new products. Examples of computer-implemented services include transactions for purchasing the new products, customer support systems (such as online chat services), tracking and managing inventory, initiating shipping of products, order tracking, managing customer communication with the client devices (112, 114), and providing information to the client devices (110) that include information about previous orders, transaction information associated with current, past, or future orders, and/or any other information associated with the processing of one or more orders.

The volume of orders may impact the required number of order processing agents (136). In one or more embodiments, the processing of orders is performed using order processing agents (136) of the order processing system (130). The order processing agents (136) may each include functionality to communicate with the client devices (110) to provide the aforementioned services based on products offered by a corporate entity managing the order processing system (130).

Figure 5:
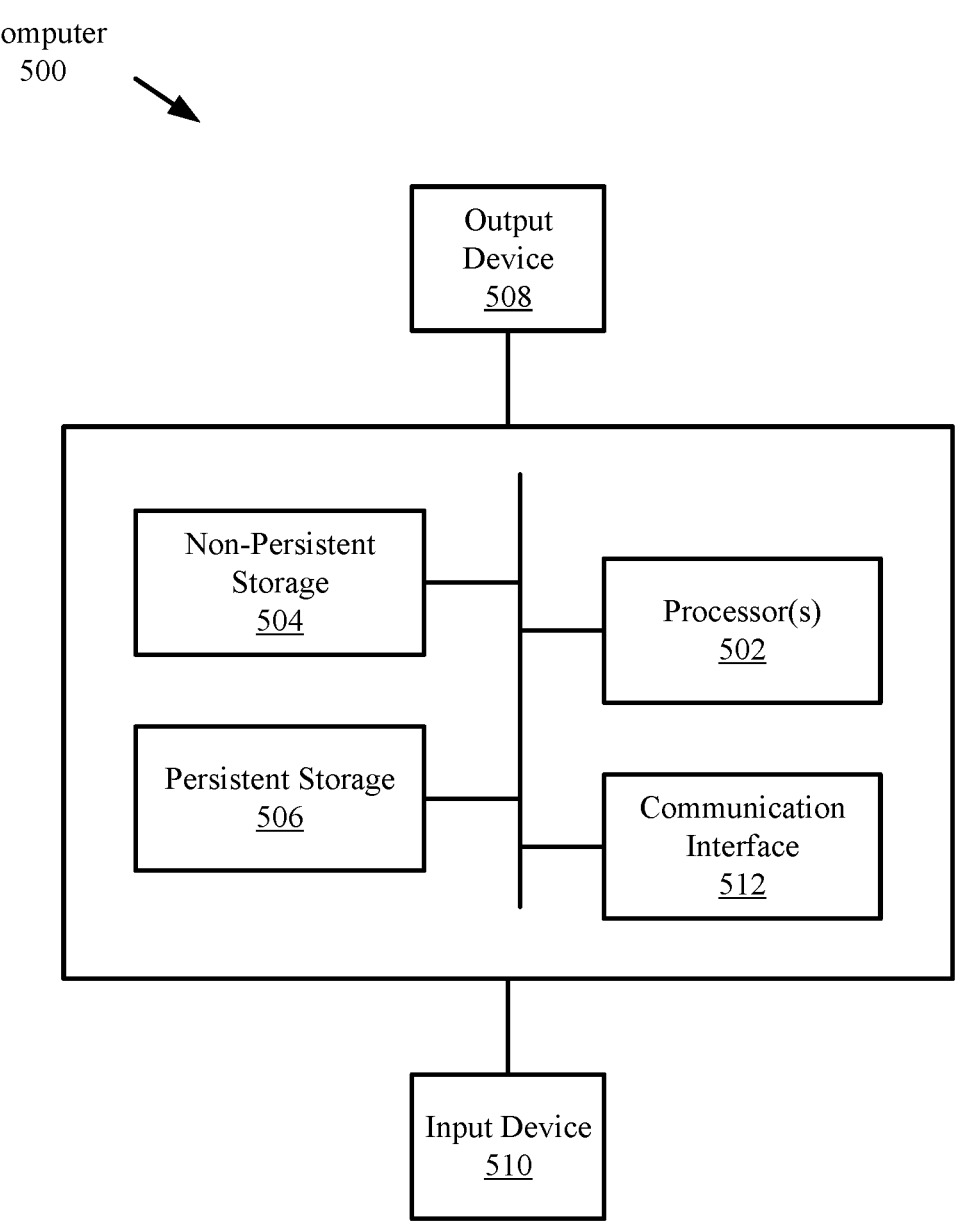
FIG. 5 shows a diagram of a computing device in accordance with one or more embodiments of the invention.

In one or more embodiments of the invention, the order processing system (130) (and/or any components illustrated within) may be implemented as one or more computing devices (e.g., 500, FIG. 5). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the order processing system (130) (and/ or any components illustrated within) described throughout this present disclosure.

Alternatively, in one or more embodiments of the invention, the order processing system (130) (and/or any components illustrated within) may be implemented as logical devices. A logical device may utilize the computing resources of any number of computing devices to provide the functionality of the order processing system (130) (and/ or any components illustrated within) described throughout this present disclosure.

In one or more embodiments, the deployment of the processing agents (136) is managed by an agent deployment manager (132). In one or more embodiments, the agent deployment manager (132) includes functionality for assigning each of the order processing agents (136) to service the client devices (110) in accordance with the functionality of the order processing system (130) discussed throughout this disclosure. The agent deployment manager (132) may make determinations for when to boot up the order processing agents (136), when to assign each of the processing agents (136) on standby, and/or when to reduce the number of processing agents (136) providing the services of the order processing system (130). Further, the agent deployment manager (132) may initiate the booting or powering down of the processing agents (136) in accordance with the aforementioned determinations.

To make such determinations, the agent deployment manager (132) may utilize the functionality of the order forecasting manager (134). While illustrated as a separate entity, the order forecasting manager (134) may be a component of the order processing system (130) without departing from the invention. The order forecasting manager (134) may include functionality for generating order forecasts for a given period of time. The order forecasts may be generated as forecasting sequences which may be represented as, for example, graphical Fourier transform. The forecasting sequences may represent outputs of an expected volume of orders for a point in time. In one or more embodiments, the expected volume of orders for a point in time may be an estimated average number of orders that an epicenter of a corporate entity is predicted to process over a predefined period of time (e.g., a week). In one or more embodiments, an epicenter of a corporate entity is a logical partitioning of entities within the corporate entity based on factors such as geographical regions in which the entities of the corporate entity operate. The entities may be, for example, employees and the computing devices used by the employees to provide the services (or enable the computing devices to provide said services) of the order processing system (130).

Figure 3:
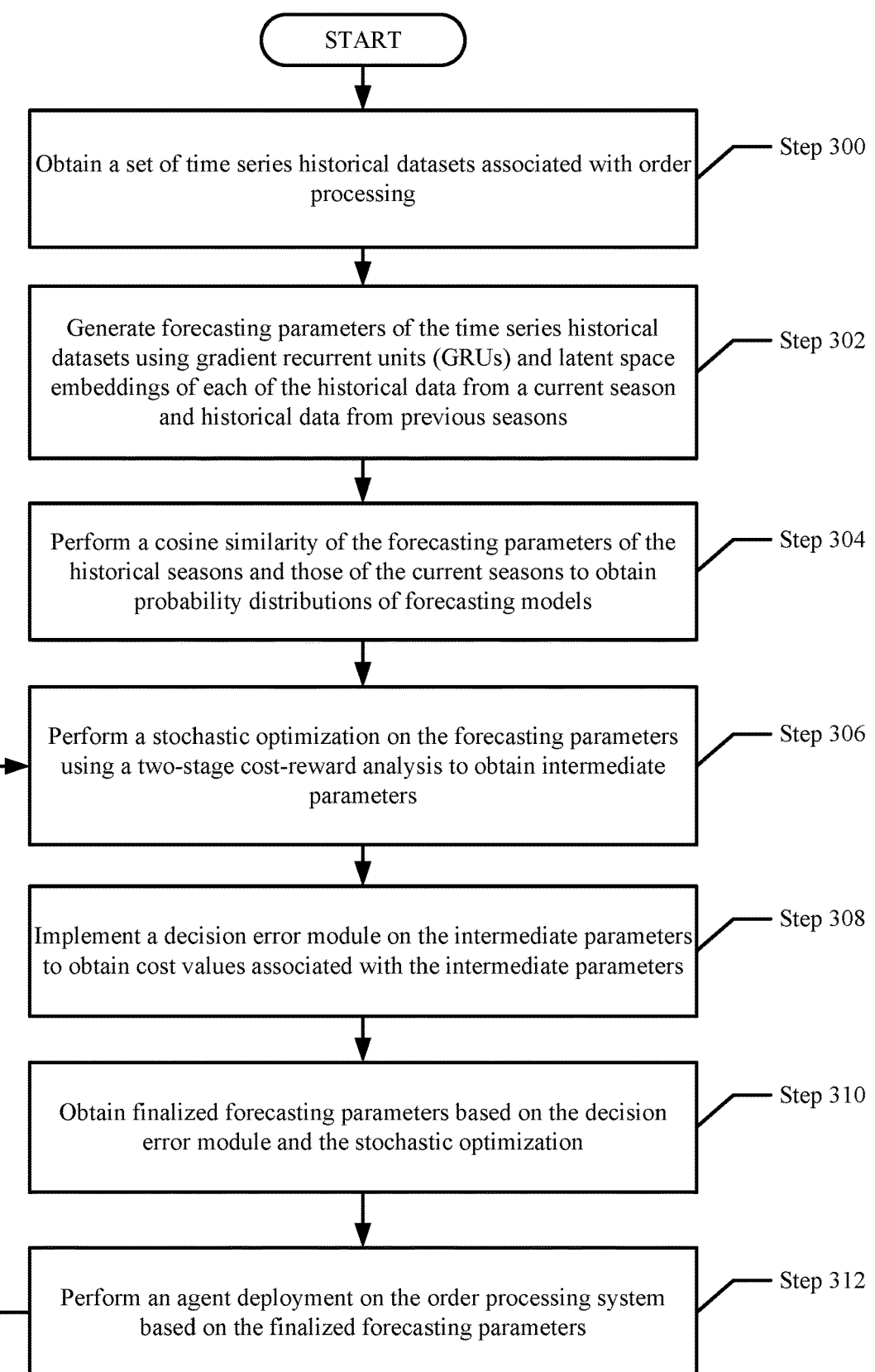
FIG. 3 shows a flowchart of a method of generating forecasting models in accordance with one or more embodiments of the invention.

In one or more embodiments, the order forecasting manager (134) performs the generation of the forecasting models using the methods described in FIG. 3. The order forecasting manager (134) may perform other methods to generate the forecasting models in accordance with one or more embodiments of the invention.

Figure 4:
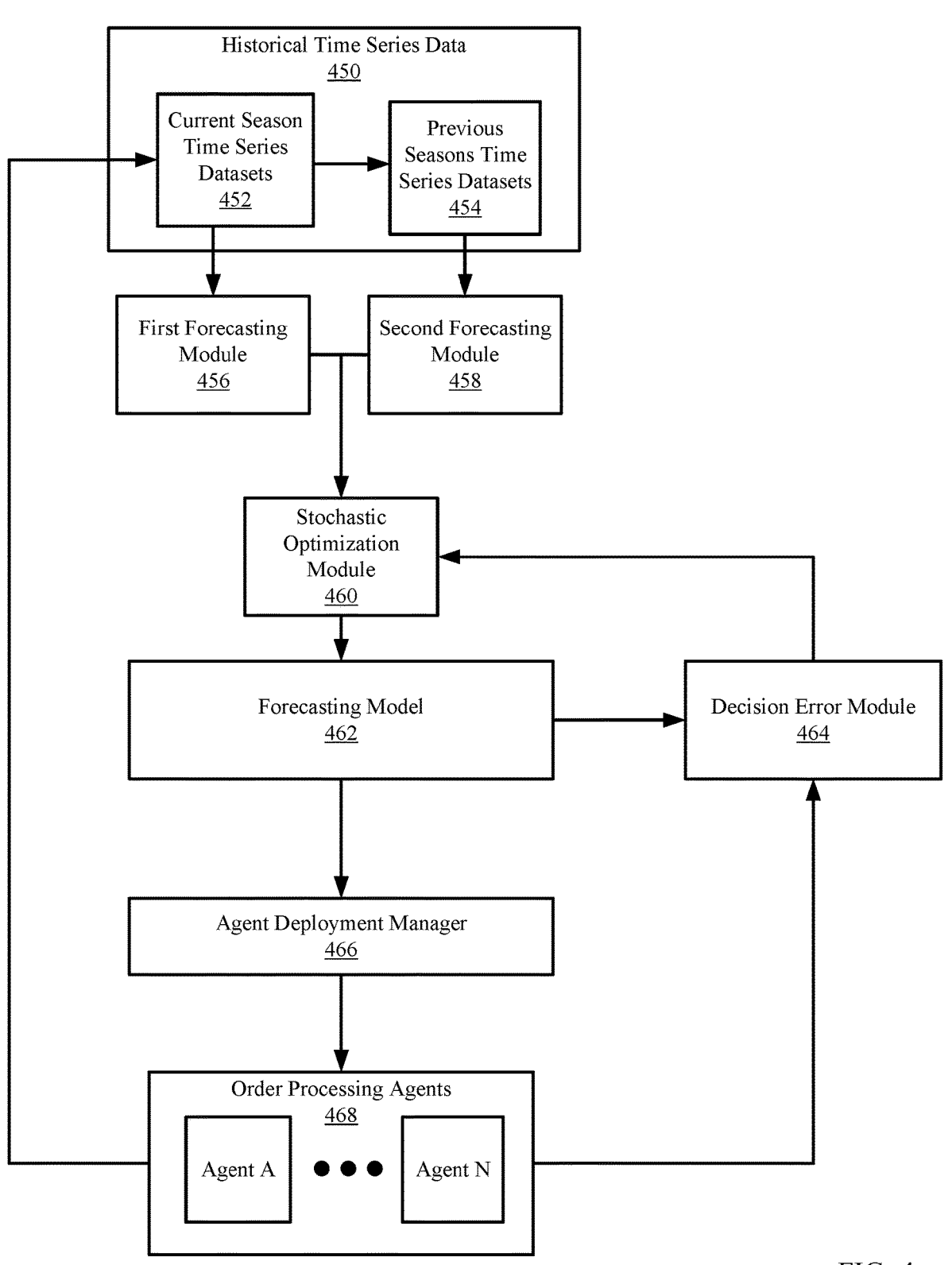
FIG. 4 shows an example in accordance with one or more embodiments of the invention.

In one or more embodiments of the invention, the order forecasting manager (134) (and/or any components within) may be implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the order forecasting manager (134) (and/or any components within) described throughout this present disclosure including, for example, the method illustrated in FIG. 3.

Alternatively, in one or more embodiments of the invention, the order forecasting manager (134) (and/or any components within) may be implemented as logical devices. A logical device may utilize the computing resources of any number of computing devices to provide the functionality of the order processing system (130) (and/or any components illustrated within) described throughout this present disclosure including, for example, the method illustrated in FIG. 3.

In one or more embodiments of the invention, the above-mentioned system (100) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

Figure 2:
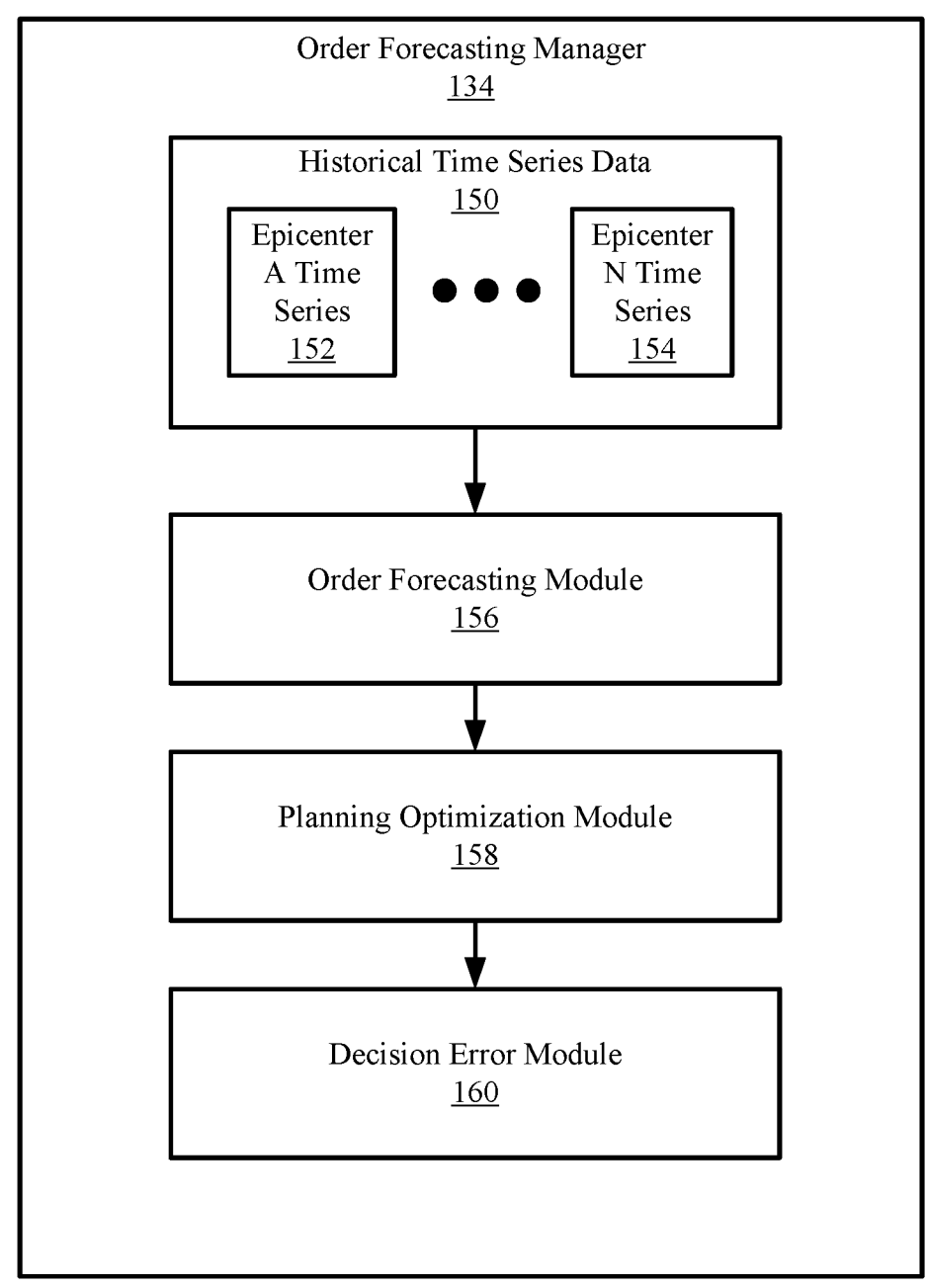
FIG. 2 shows a diagram of an order forecasting manager in accordance with one or more embodiments of the invention.

FIG. 2 shows a diagram of an order forecasting manager (134) in accordance with one or more embodiments. In one or more embodiments, the order forecasting manager (134) obtains historical time series data (150) from, for example, the order processing system (130, FIG. 2). The historical time series datasets (150) (also referred to as time series datasets or historical datasets) may specify a relationship between points in time and the corresponding number of orders for a period of time. As discussed above, the time series datasets includes combinations of both independent and identically distributed (IID) and non-IID data. In one or more embodiments, IID data refers to data that follows detectable patterns or trends. The patterns may be based on time seasons, based on expected periodic nature of order purchases, or based on any other internal or external factors without departing from the invention.

In one or more embodiments, each time series dataset (152, 154) is associated with an epicenter. As discussed above, an epicenter of a corporate entity is a logical partitioning of entities within the corporate entity based on factors such as geographical regions in which the entities of the corporate entity operate. The epicenters may each track their order processing information (e.g., number of orders for a given point in time) and provide an epicenter time series dataset (152, 154) to be used for the order forecasting models.

In one or more embodiments, to generate the outputted forecasting models, the time series datasets (150) may be processed using an order forecasting module (156), a planning optimization module (158), and a decision error module (160). In one or more embodiments, the order forecasting module (156) is a processing component used to generate probability distributions of a set of forecasting models using a functional space. The output probability distributions are applied to the planning optimization module (158). In one or more embodiments, the planning optimization module (158) includes implementing the generated forecasted models in accordance with the probability distributions obtained from the order forecasting module (156) based on a deterministic representation as a stochastic optimization function. The stochastic optimization function may be a minimization of a given cost parameter to obtain given intermediate parameters of the forecasting module. The intermediate parameters may be processed using the decision error module (160) to obtain finalized forecasting parameters. The finalized forecasting parameters may be used to define a finalized forecasting model.

FIG. 3 shows a flowchart of a method of generating forecasting models in accordance with one or more embodiments of the invention. The method shown in FIG. 3 may be performed by, for example, an order forecasting manager (e.g., 134, FIG. 1). Other components of the system in FIGS. 1-2 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

Turning to FIG. 3, in step 300, a set of time series historical datasets are obtained. In one or more embodiments, the set of time series datasets are obtained from the order processing systems. As discussed above, each time series dataset may be associated with an epicenter. Further, the obtained time series datasets may include any combination of independent and identically distributed (IID) data and non-IID data.

In step 302, forecasting parameters of the time series historical datasets are generated using gradient recurrent units (GRUs) and latent space embedding of each of the historical data from a current season and historical data from previous seasons. In one or more embodiments, an order forecasting module of the order processing manager uses historical data to learn the dependence of recent historical orders in quarters of the current year on the forecast and also learns the correlation between past years' time period (e.g., quarters of a given year) with the current year's quarters to model a seasonality influence. The historical dataset from the past quarters of the current year t is denoted by H_t and the dataset with the historical dataset from the past years' current quarter i is denoted by $H\_s = H\_(1, \ldots, t)\hat{}i$.

In one or more embodiments, the following functions are applied to the historical data: (i) a first latent space embedding of the historical dataset from the past quarters using a GRU, (ii) a second latent space embedding of the historical dataset from the current year using the GRU, (iii) a third latent space embedding using the first embedding, and (iv) a fourth latent space embedding using the second latent space embeddings.

In step 304, a cosine similarity of the forecasting parameters associated with historical seasons and those associated with the current season to obtain probability distributions of forecasting models. As can be seen in step 302, the latent space embeddings for this sequential historical data are generated and are modelled as random variables. The similarity in the trends of the historical data and the current year data is modelled by leveraging cosine-similarity scores between the latent space embeddings.

The forecasting parameters are modelled as random variables as opposed to single-point values as they can capture the temporal correlations and underlying uncertainty better. In one or more embodiments, the third latent space embedding and the fourth latent space embedding of the historical data for current year past seasons H_t, the embeddings emb(u_s) of the historical data for past year H_s and the cosine similarity score between the two sequence embeddings are concatenated to give v_t using which the probability distributions p(y_t|v_t) of the forecasting models are modelled using a multi-layer perceptron (MLP) neural network.

In step 306, a stochastic optimization is performed on the forecasting parameters using a two-stage cost-reward analysis to obtain intermediate parameters. In one or more embodiments, the stochastic optimization problem states are modelled with the decision variables x_t such as overtime hours, planned outage, meeting hours and unplanned outage hours. The unplanned outage refers to the vacations, sick leaves, or absence of operators of the order processing agents due to unforeseen conditions and is modelled as a random variable as it is highly uncertain in nature. The meeting hours refers to the total time spent on ad-hoc calls, in-person, or virtual meetings by the operators and this is also modelled as a random variable as it is also highly variable. The exogeneous information w_t to the optimization problem is the forecast distribution from the upstream order forecasting module. The optimization objective min $E(C(x\_t,w\_t))$ where the cost function is a measure of the underutilization of order processing agents and overutilization of order processing agents with respect to the available headcount of the agents and the estimated headcount based on the decision variables $x\_t$ and the forecast distribution $w\_t$.

In one or more embodiments, the stochastic optimization module is a multi-stage module, where the initial stages include the decision made involving parameters that do not involve randomness. In the subsequent stages, the realization of the uncertain parameters is obtained from the probability distribution $p(y|x)$ and a second optimization problem is solved with these parameters. A two-stage stochastic optimization problem can be modelled as follows: (i) the objective function $O(x,w)=\min E(C(x,w)-\min E(H\_a(x)-H\_p(x,w))^2$, and (ii) $H\_p(w|x=x\_f)=w/(k*[(z(x)]\_f,w))$, where $H\_a(x)$ is the available headcount also, the first stage cost which is a certain parameter and $H\_p(x,w)$ is the second stage cost and is the required predicted headcount, where there is randomness induced due to the forecast distributions and the decision variables that are uncertain, and where w is drawn from the probability distribution $p(y|x)$ of order forecast generated by the upstream prediction module and that represents the expected incoming number of orders. The $z(x\_f,w)$ represents the orders processed per day (OPPD) which is dependent on both the decision variables obtained from first stage $x\_f$ and order forecast w.

Following the implementation of the multi-stage module, a set of intermediate parameters is obtained. In one or more embodiments, the set of intermediate parameters is obtained by minimizing the above second stage cost which results in optimal $x^*$, $w^*$ which results in minimized cost of under-resourcing/over-resourcing $C(x,w)$. In one or more embodiments, the $x^*$, $w^*$ for the optimal cost $C^*(x,w)=C(x^*, w^*)$ is used to modify the availability of the OP agents and ensure that we are adequately staffed for carrying out order processing. The intermediate parameters may be used in a forecasting model for agent deployment.

In step 308, a decision error module is implemented on the intermediate parameters to obtain cost values associated with the intermediate parameters and using the historical dataset. In one or more embodiments, the decision error module connects the forecasting module and the stochastic planning module for collective optimization which enables us in generating more optimized decisions. To establish the communication between the forecasting module and the downstream planning module, the solution proposes a decision error module that rewards forecasts that generate collective reduction in prediction error and optimization regret and penalizes the forecasts that generate good predictions but higher optimization regret. Embodiments of the invention may differ from existing solutions as they use the reward formulation framework to circumvent the problem of developing differentiable approximations for optimization regret to induce it into the prediction error for backpropagation.

In step 310, finalized forecasting parameters are obtained based on the decision error module and the stochastic optimization. In one or more embodiments, the decision error module is modelled in the reinforcement learning setting where the forecast is tuned so that they are modified accordingly to generate better decisions when used in the stochastic optimization problem. The value that can be derived out of modifying the forecasted order distribution on an instance t can be approximated by the state-action value function $Q(s,a)$. Due to the sequential nature of the order influx and management, the interactions between the decision error module and the order processing activities are modelled as a Markov decision process. An action value function may associated with the Markov decision process is maximized to obtain finalized forecasting parameters such as optimal actions and optimal policy.

In step 312, an agent deployment is initiated in accordance with the finalized forecasting models. In one or more embodiments, the agent deployment may be initiated such that the number of available agents for an upcoming point in time is increased if the forecasting models indicate a larger number of orders. Further, the number of agents may be decreased for a future point in time in which the forecasting models indicate a relatively low number of orders for the upcoming point in time.

Following the agent deployment of step 312, the method of FIG. 3 may return to step 306 to perform the stochastic optimization using information corresponding to the implementation of the agent deployment in accordance with step 312. Such information may be incorporated in the decision variables $x\_t$ discussed throughout.

To further clarify embodiments of the invention described throughout this disclosure, a non-limiting example is provided in FIG. 4.

Example

Consider a scenario in which an order processing system for a business processes fluctuating and/or seasonally-based order volumes tracked each week. The order volumes are tracked as historical time series datasets.

FIG. 4 shows an example system in accordance with one or more embodiments of the invention. The example system illustrates the flow of data or other information using arrows between components of the example system. The components may be, for example, modules or data structures.

The example system includes the historical time series datasets (450) being processed in accordance with FIG. 3 to obtain a forecasting model (462). The processing includes applying a current season time series dataset (452) on a first forecasting module (456) and time series datasets (454) associated with previous seasons to a second forecasting modules (458). Each forecasting module (456, 458) generates the forecasting parameters using the latent space embeddings as discussed in step 302. The forecasting parameters generated from the forecasting modules (456, 458) are compared using the cosine similarity and the MLP layers to obtain the forecasting model (462). The forecasting model (462) is defined using the forecasting parameters and probability distributions of the forecasting parameters.

The forecasting model (462) is used by the agent deployment manager (466) to initiate deployment of the order processing agents (468). For example, for an input of a current point in time, the forecasting model (462) outputs an expected order volume. Based on the expected order volume, the agent deployment manager (466) modifies the number of available order processing agents (468) used for performing order processing tasks on the expected order volume.

The implementation of the forecasting model (462) and the actual order volume is tracked. Information corresponding to the headcount and the actual order volume during the implementation and the expected order volume from the forecasting model (462) are input into the decision error module (464). Further, the information is further used to update the current season time series datasets (452).

The decision error module (464) performs the method of FIG. 3 to generate a reward value based on the accuracy of the current forecasting parameters of the forecasting model (462). The reward value and the corresponding forecasting parameters are applied to the stochastic optimization module (460). The stochastic optimization module (460) further applies the reward value as decision variables and the updated forecasting parameters generated using updated historical time series data (450) to obtain more optimized forecasting parameters (also referred to as finalized forecasting parameters). The finalized forecasting parameters are used to update the definition of the forecasting model (462).

The above updating of the forecasting model (462) may be used to continue a cycle of implementing agent deployment in accordance with an updated forecasting model, and using information from the deployment to further update the forecasting model. In this manner, the forecasting model (462) improves over time in accuracy.
End of Example As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for optimizing resource use for processing orders. Embodiments disclosed herein provide methods and systems for forecasting future orders and using the forecasts to manage the resources reserved for such orders. For high numbers of orders forecasted, embodiments disclosed herein enable preparation of these high numbers by preemptively deploying additional resources (e.g., agents) for handling the expected high number of orders. Conversely, for low numbers of orders, the number of resources reserved for order processing may be reduced, thus preserving the resource consumption of the order processing system.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing order processing, the method comprising:

obtaining, by an agent deployment manager of an order processing system executing on a processor, a set of time series datasets associated with the order processing for an order processing system;

generating forecasting parameters of the time series datasets using gradient recurrent units (GRU) and a latent space embedding;

performing a cosine similarity of the forecasting parameters to obtain probability distributions of forecasting models;

performing a stochastic optimization on the forecasting parameters using a two-stage cost-reward analysis to obtain intermediate parameters;

obtaining finalized forecasting parameters based on the intermediate parameters; and initiating an agent deployment on the order processing system based on the finalized forecasting parameters, wherein the agent deployment comprises modifying a number of agents executing for the order processing system on the processor, and wherein each of the agents are implemented as computing devices.

2. The method of claim 1, wherein generating the forecasting parameters comprises:

applying a first GRU to a first time series dataset and the latent space embedding on the first time series dataset to obtain first embedding parameters; and applying a second GRU to a second time series dataset and the latent space embedding on the second time series dataset to obtain second embedding parameters, wherein the first time series dataset is associated with a current season, and wherein the second time series dataset is associated with a previous season.

3. The method of claim 2, wherein performing the cosine similarity comprises generating a cosine similarity score based on the first and second embedding parameters, and wherein the probability distributions are obtained using the cosine similarity score.

4. The method of claim 1, further comprising:

after performing the stochastic optimization and before obtaining the finalized forecasting parameters: implementing a decision error module on the intermediate parameters to obtain cost values associated with the intermediate parameters; and performing a second stochastic optimization on the intermediate parameters based on the cost values to obtain second intermediate parameters, wherein the finalized forecasting parameters are based on the second intermediate parameters.

5. The method of claim 1, wherein each of the set of time series datasets is associated with an epicenter of an order processing system.

6. The method of claim 1, wherein the finalized forecasting parameters indicate a high number of orders during a future period in time, and wherein performing the agent deployment comprises increasing a number of agents for order processing during the future period of time.

7. The method of claim 1, wherein the finalized forecasting parameters indicate a low number of orders during a future period in time, and wherein performing the agent deployment comprises decreasing a number of agents for order processing during the future period of time.

8. A non-transitory computer readable medium comprising computer readable program code, which when executed by a computer processor enables the computer processor to perform a method for managing order processing, the method comprising:

obtaining a set of time series datasets associated with the order processing for an order processing system;

generating forecasting parameters of the time series historical datasets using gradient recurrent units (GRU) and a latent space embedding;

performing a cosine similarity of the forecasting parameters to obtain probability distributions of forecasting models;

performing a stochastic optimization on the forecasting parameters using a two-stage cost-reward analysis to obtain intermediate parameters;

obtaining finalized forecasting parameters based on the intermediate parameters; and initiating an agent deployment on the order processing system based on the finalized forecasting parameters, wherein the agent deployment comprises modifying a number of agents executing for the order processing system on the processor, and wherein each of the agents are implemented as computing devices.

9. The non-transitory computer readable medium of claim 8, wherein generating the forecasting parameters comprises:

applying a first GRU to a first time series dataset and the latent space embedding on the first time series dataset to obtain first embedding parameters; and applying a second GRU to a second time series dataset and the latent space embedding on the second time series dataset to obtain second embedding parameters, wherein the first time series dataset is associated with a current season, and wherein the second time series dataset is associated with a previous season.

10. The non-transitory computer readable medium of claim 9, wherein performing the cosine similarity comprises generating a cosine similarity score based on the first and second embedding parameters, and wherein the probability distributions are obtained using the cosine similarity score.

11. The non-transitory computer readable medium of claim 8, further comprising:

after performing the stochastic optimization and before obtaining the finalized forecasting parameters: implementing a decision error module on the intermediate parameters to obtain cost values associated with the intermediate parameters; and performing a second stochastic optimization on the intermediate parameters based on the cost values to obtain second intermediate parameters, wherein the finalized forecasting parameters are based on the second intermediate parameters.

12. The non-transitory computer readable medium of claim 8, wherein each of the set of time series datasets is associated with an epicenter of an order processing system.

13. The non-transitory computer readable medium of claim 8, wherein the finalized forecasting parameters indicate a high number of orders during a future period in time, and wherein performing the agent deployment comprises increasing a number of agents for order processing during the future period of time.

14. The non-transitory computer readable medium of claim 8, wherein the finalized forecasting parameters indicate a low number of orders during a future period in time, and wherein performing the agent deployment comprises decreasing a number of agents for order processing during the future period of time.

15. A system, comprising:

a processor; and memory including instructions, which when executed by the processor, perform a method comprising:

obtaining a set of time series datasets associated with the order processing for an order processing system;

generating forecasting parameters of the time series historical datasets using gradient recurrent units (GRU) and a latent space embedding;

performing a cosine similarity of the forecasting parameters to obtain probability distributions of forecasting models;

performing a stochastic optimization on the forecasting parameters using a two-stage cost-reward analysis to obtain intermediate parameters;

obtaining finalized forecasting parameters based on the intermediate parameters; and initiating an agent deployment on the order processing system based on the finalized forecasting parameters, wherein the agent deployment comprises modifying a number of agents executing for the order processing system on the processor, and wherein each of the agents are implemented as computing devices.

16. The system of claim 15, wherein generating the forecasting parameters comprises:

applying a first GRU to a first time series dataset and the latent space embedding on the first time series dataset to obtain first embedding parameters; and applying a second GRU to a second time series dataset and the latent space embedding on the second time series dataset to obtain second embedding parameters, wherein the first time series dataset is associated with a current season, and wherein the second time series dataset is associated with a previous season.

17. The system of claim 16, wherein performing the cosine similarity comprises generating a cosine similarity score based on the first and second embedding parameters, and wherein the probability distributions are obtained using the cosine similarity score.

18. The system of claim 15, further comprising:

after performing the stochastic optimization and before obtaining the finalized forecasting parameters: implementing a decision error module on the intermediate parameters to obtain cost values associated with the intermediate parameters; and performing a second stochastic optimization on the intermediate parameters based on the cost values to obtain second intermediate parameters, wherein the finalized forecasting parameters are based on the second intermediate parameters.

19. The system of claim 15, wherein the finalized forecasting parameters indicate a high number of orders during a future period in time, and wherein performing the agent deployment comprises increasing a number of agents for order processing during the future period of time.

20. The system of claim 15, wherein the finalized forecasting parameters indicate a low number of orders during a future period in time, and wherein performing the agent deployment comprises decreasing a number of agents for order processing during the future period of time.

\* \* \* \* \*